United States Patent Office 2,801,462
Patented Aug. 6, 1957

2,801,462
BEARING COMPOSITION

Frank C. Wagner, Solon, and John T. Burwell, Jr., Gates Mills, Ohio, assignors to Horizons Incorporated No Drawing. Application January 26, 1955, Serial No. 484,300

8 Claims. (Cl. 29—182.1)

This invention relates to a new and novel bearing material and to a novel method of manufacturing such a material.

One object of this invention is to provide a bearing material which will perform in an outstanding manner under normal loads and at elevated speeds and temperatures.

Another object of this invention is to provide a superior bearing material to be used in the retainers of the roller bearings of an aircraft gas turbine.

A further object of this invention is to provide a material having a greater resistance to oxidation at elevated temperatures than present-day bearing materials such as babbits or white metals.

A further object of this invention is to provide an improved bearing material which, because of inherent low friction, tends to produce relatively little heat due to friction when in service.

An additional object of our invention is to provide a method of obtaining a bearing material possessing the above advantages in which the several compositional components are physically present in a desired configuration involving a carrier or matrix phase and a lubricant phase dispersed therein.

These and other objects will become apparent from the following description taken in connection with the appended claims.

Present-day premium bearing materials invariably are formed of at least two components: a soft lubricating constituent and a harder load-carrying constituent. Three general arrangements of these have been evolved. The oldest arrangement is to dispose a hard phase throughout a softer phase as in a conventional babbit. More recently it has been the practice to dispose the softer phase in the form of a thin layer on at least one surface of a harder phase. A third arrangement is the reverse of the first and embodies dispersions of a softer material in a relatively hard matrix. Our invention is directed principally to a bearing material in which the two phases are disposed in the latter fashion because it appears to offer the best combination of properties. Such two phase combinations, it has been shown, produce a friction coefficient which is much lower than the coefficient of friction of most single phase or homogeneous materials and as a consequence under severe conditions of service the rate at which heat is evolved and the actual temperature rise of the materials involved is greatly reduced as compared with other materials. The modern theory, simply expressed, is that the hard phase tends to keep the local true contact areas small. A thin film of the soft material smeared over each of these areas acts as a lubricant with resultant low local shear strength. The total friction force which is the product of the small true contact area multiplied by the low shear strength is correspondingly low.

Many materials have been employed for the softer phase, tin, lead, cadmium and their alloys being representative of the prior art. Such materials have been found to operate satisfactorily but obviously are limited to use at temperatures well below their melting points to avoid their loss from the bearing by melting and flowing away. At service temperatures such as those for which our bearing material is intended, the prior art white metals are useless.

Obviously, then, the softer phase must be selected from materials having a melting point above the anticipated operating temperature. Advantageously, the softer constituent should also possess sufficient plasticity over a wide range of temperatures below the melting point to enable it to smear over the harder phase. Furthermore, the softer material should be comparatively inert with respect to the materials to which it is exposed. Thus, it should not alloy with or weld to the materials forming the other bearing surface, nor should it react readily with the atmosphere in which it is to be used. Pure silver possesses many of the properties necessary to meet the above service requirements, particularly when the bearing is to be used against a steel shaft at somewhat elevated temperatures. We have found that certain elements may be added to the softer silver phase in minor, but nonetheless significant amounts, to enhance the overall performance of the bearing material. For example, cadmium may be added to the silver phase to increase the wettability of the silver. Accordingly, the term "silver," as employed hereinafter in this specification, is intended to cover both elemental silver and alloys in which silver is the major constituent.

At this point is should be noted that bearings in which a softer silver constituent is dispersed throughout a harder matrix are known in the art. Typical of such bearing compositions are those disclosed in U. S. Patent 2,159,763 in which the silver phase is one containing silver and a member of the zinc group of the periodic table. The incorporation of a relatively volatile metal such as zinc presents many problems in the process of manufacturing the bearing and in service. In endeavoring to develop a composition superior to that described in the aforesaid U. S. Patent 2,159,763, we have found that a bearing which is simpler to manufacture and has greatly improved wear characteristics may be obtained by the addition of elemental silicon or a silicide to the composition. It should be particularly observed that the addition of silicon to the bearing composition does not alter the softer phase since silver and silicon do not alloy to any appreciable extent. The silicon or silicon compound, therefore, which is added for our composition appears to influence the hard load carrying phase in some manner, the exact mechanism of which is not presently known to us, with an accompanying outstanding improvement in properties.

The exact mechanism of the beneficial effect is not known, but test results hereinafter tabulated indicate that silicon-containing compositions have a substantially lower wear rate than similar compositions containing no silicon and also run more smoothly than compositions from which silicon is absent. It will be readily appreciated that the function of the silicon is entirely different from the zinc or cadmium of the prior art patent since the silicon does not appear to alloy with the silver in the manner of the zinc or cadmium. The hard phase of our duplex bearing composition to which the silicon is added may be any of a wide variety of materials since its main function is that of a support for the softer phase. Nickel and nickel-base alloys have been found to be particularly useful, but other materials such as copper and aluminum alloys may also be employed to advantage.

Compositions which we have found to be particularly suitable in the practice of our invention are comprised of a matrix of nickel or a nickel alloy, constituting between 45% and 65% of the final composition, and preferably constituting between 60% and 65% when the matrix is formed of nickel alone; silicon in the form of silicon or a metal silicide, the amount of silicon being between 2% and 8% by weight, of the weight of the matrix material; and silver or a silver alloy in amounts between 30% and 60% by weight of the overall composition. Preferably, the silver should be present in the proportion of between 32% and 48% by weight of the composition. A particularly wear-resistant composition which performs at temperatures in the vicinity of 640° F. is one containing between 60% and 65% nickel, about 33% silver and the balance silicon or a metal silicide.

The two phases are most effective as a bearing material when one is dispersed in a matrix of the other. The preparation of our bearing compositions with the two phases disposed in the proper relationship to one another is most conveniently achieved through powder metallurgy techniques although in some instances compositions with the desired duplex structure have been obtained by casting. The applicable powder metallurgy methods fall generally into two broad groups depending on the manner in which the silver phase is caused to enter the composition.

In a first embodiment, the components of the hard phase are reduced to any desired particle size and are thereafter mixed with a binder and compacted. In some instances the use of a binder may be unnecessary and the matrix material may be compacted without any binder. The compact is next sintered in a controlled atmosphere furnace since the formation of any oxide on the matrix material is undesirable because it prevents the silver of the softer phase from properly wetting the particles of the matrix material. After the compact is sintered it is cooled in an inert or reducing atmosphere to a temperature at which it will not oxidize. Then the constituents of the soft phase are placed in contact with the sintered compact and the entire mass is heated to a temperature at which the softer phase liquifies and is imbibed in the pores of the porous compact of sintered matrix material. The impregnated compact is then cooled in an inert atmosphere and any excess impregnant is removed by wire brushing or other means. The two phase composition is then machined or coined or otherwise processed as necessary to form the desired bearing.

Instead of sintering the matrix and then infiltrating the softer phase into the matrix in a separate subsequent processing step, the impregnation can be effected during the sintering step, with a resultant simplification in the process and an attendant economy of operation.

Other methods of forming the desired duplex structure will be readily apparent to those skilled in the art. As previously noted, the composition may in some instances be prepared by casting. Alternatively, the sintered compact may be subjected to a vacuum and then impregnated with the second phase in liquid form, or the ingredients in our composition may be mixed as finely divided powders and hot-pressed at suitably elevated temperatures and pressures to form the desired bearing. The following specific examples are therefore to be considered as illustrative rather than limitative of the practice of our invention:

EXAMPLE I

In this example a hard matrix of nickel was prepared, sintered and subsequently impregnated with finely divided silver to 100% density. Nickel powder (—100 mesh, Tyler Standard) was mixed with 4% by weight of silicon and with about 2% by weight of paraffin and pressed at about 14 tons per square inch into the form of a compact roughly 4 inches by 1 inch by ½ inch. The compact was placed in a porcelain boat and was sintered at 1100° C. in a hydrogen atmosphere for 60 minutes. After the compact had cooled in hydrogen, a sheet of pure silver was placed along one edge of the sintered compact, and the boat was reinserted into the controlled atmosphere furnace. The furnace was flushed with hydrogen gas and rapidly heated to about 50° C. above the melting point of the silver, whereby the silver infiltrated into the pores of the compact. After the infiltration was completed the furnace was cooled and then the compact was removed. Excess silver was removed by brushing or grinding, leaving a material consisting of a hard nickel matrix in which silver was more or less uniformly dispersed. Metallographic examination of the compact revealed that very little alloying had taken place between the silver and the nickel. When formed into a bearing the material performed satisfactorily at temperatures above 500° F.

EXAMPLE II

In this example sintering and impregnation were effected during a single heating step. Nickel powder (—100 mesh, Tyler Standard) was mixed with 4% by weight of elemental silicon and was compacted under a pressure of between 10 and 15 tons per square inch to form a compact approximately the same size as that of the preceding example. The compact was removed from the die and the actual density of the compact was calculated. Based on the calculation, an amount of silver in the form of shot was distributed about the compact in a porcelain boat, the silver being slightly more than the amount required to provide an infiltrated compact of 100% density. The assembly was placed in a controlled atmosphere furnace that had been heated to just above the melting point of silver. The compact was sintered and infiltrated in a dry hydrogen atmosphere for about 2 hours, after which it was cooled in an inert atmosphere. The resulting material was machined into the form of a bearing and performed satisfactorily at temperatures as high as 500° F.

Following the procedure of either Example I or II above, the following compositions were prepared from mixtures of silicon (1, 2, 4, 5, 7 and 8 below) or molybdenum disilicide (3, 6 and 9 below) with powdered nickel-chromium alloy, Monel or nickel.

*Table I*

BEFORE INFILTRATION, WEIGHT PERCENT COMPOSITION

| No. | Cr | Ni | Monel | Si | MoSi₂ | | Percent Theoretical Density |
|-----|------|------|-------|------|------|------|------|
|     |      |      |       |      | Mo | Si |  |
| 1 | 48.0 | 48.0 |       | 4.0 |      |     | 64.0 |
| 2 | 46.0 | 46.0 |       | 8.0 |      |     | 63.6 |
| 3 | 45.0 | 45.0 |       |     | 6.3 | 3.7 | 61.0 |
| 4 |      |      | 96.0 | ¹4.0 |     |     | 69.8 |
| 5 |      |      | 92.0 | ¹8.0 |     |     | 72.6 |
| 6 |      |      | 88.0 | ¹2.0 | 6.3 | 3.7 | 75.4 |
| 7 |      | 96.0 |       | 4.0 |     |     | 75.0 |
| 8 |      | 92.0 |       | 8.0 |     |     | 75.1 |
| 9 |      | 90.0 |       |     | 6.3 | 3.7 | 74.5 |

¹ Includes Si content of the Monel metal.

AFTER INFILTRATION, WEIGHT PERCENT COMPOSITION

| No. | Cr | Ni | Monel | Si | Mo | Si | Ag | Percent Theoretical Density |
|-----|------|------|-------|------|------|------|------|------|
| 1 | 25.8 | 25.8 |       | 2.1 |     |     | 46.3 | 98+ |
| 2 | 24.7 | 24.7 |       | 4.3 |     |     | 46.3 | 98+ |
| 3 | 24.3 | 24.3 |       |     | 3.4 | 2.0 | 46.0 | 98+ |
| 4 |      |      | 62.3 | 2.5 |     |     | 35.2 | 98+ |
| 5 |      |      | 61.0 | 4.9 |     |     | 34.1 | 98+ |
| 6 |      |      | 59.5 | 1.5 | 4.3 | 2.5 | 32.2 | 98+ |
| 7 |      | 64.7 |       | 2.6 |     |     | 32.7 | 98+ |
| 8 |      | 61.9 |       | 5.4 |     |     | 32.7 | 98+ |
| 9 |      | 59.8 |       |     | 4.2 | 2.5 | 33.5 | 98+ |

The compositions of Table I were formed into bearings and tested for wear, at various temperatures. The results are summarized in Table II.

Table II

| Composition | Temperature, °F. | Wear Rate, Inches/Hour |
|---|---|---|
| 1 | 240-535 | .004-.022 |
| 2 | 220-490 | .008-.014 |
| 3 | 205-600 | .001-.010 |
| 4 | 175-650 | .004-.042 |
| 5 | 395-440 | .016-.024 |
| 6 | 205-510 | .010-.034 |
| 7 | 190-620 | .002-.019 |
| 8 | 185-640 | .001-.013 |
| 9 | 310-640 | .004-.016 |

For purposes of comparison, wear rates of some other materials commonly employed in bearings which were tested under similar conditions, are appended below:

Table III

| Material | Temperature, °F. | Wear Rate, Inches/Hour |
|---|---|---|
| "S" Monel [1] | 360 | .020 |
| "S" Monel | 410 | .046 |
| Bronze [2] | 420 | .020 |
| Cast Inconel | 450 | .026 |

[1] Nominal composition: 63% Ni, 30% Cu, 2% Fe, 4% Si, .5% Mn and 1% C.
[2] Nominal composition: 2.5-4% Si, 1-2% Fe, 1.5-4% Zn, 1% Max. Mn, .1% Max. P, .1% Max. Pb—balance Cu.

From the foregoing it will be seen that compositions such as 7, 8 and 9 above comprising about 33% silver, 2-8% silicon, balance nickel could be used at temperatures well above 640° F., and hence, were far superior to such materials as "S" Monel, silicon bronze or cast Inconel.

We claim:

1. A bearing composed of a supporting matrix of a relatively hard sintered nickel base material having between 2% and 8% by weight of silicon based on the weight of the matrix material distributed therein and a softer phase constituting between 30% and 60% by weight of said composition and being uniformly dispersed throughout the harder matrix, said softer phase being chosen from materials of the group consisting of silver and silver alloys.

2. A bearing composed of a strong load-supporting matrix of a relatively hard sintered material of the group consisting of nickel and nickel alloys and containing between 2% and 8% by weight of silicon based on the weight of the matrix material distributed therein and a softer phase constituting between 30% and 60% by weight of said composition and being uniformly dispersed throughout the harder matrix, said softer phase being chosen from materials of the group consisting of silver and silver alloys.

3. A bearing composition composed of a strong load-supporting phase of a relatively hard sintered material of the group consisting of nickel, nickel-chromium and nickel-copper alloys and containing between 2% and 8% by weight of silicon based on the weight of the matrix material distributed therein and a softer phase constituting between 30% and 60% by weight of said composition and being uniformly dispersed throughout the harder matrix, said softer phase being chosen from materials of the group consisting of silver and silver alloys.

4. A bearing composed of a sintered porous sponge forming a strong load-supporting framework from the group consisting of nickel and nickel alloys and containing between 2% and 8% silicon, by weight based on the weight of the sponge distributed uniformly throughout the sponge, impregnated with between about 30% and 60% by weight of a material from the group consisting of silver and silver alloys.

5. A bearing composed of a sintered porous sponge forming a strong load-supporting framework from the group consisting of nickel and nickel alloys and containing between 2% and 8% by weight of silicon in the form of a silicon-containing material of the group consisting of silicon and metal silicides, based on the weight of the sponge distributed uniformly throughout the sponge, impregnated with between about 30% and 60% by weight of a material from the group consisting of silver and silver alloys.

6. A sintered and impregnated bearing composition consisting essentially of between 30% and 60% by weight of silver, between 65% and 45% of metal from the group consisting of nickel and alloys of nickel and the balance essentially a material from the group consisting of silicon and metal silicides.

7. A sintered and impregnated bearing composition consisting essentially of between 32% and 48% by weight of silver, between 45% and 65% of metal from the group consisting of nickel and alloys of nickel and the balance essentially a material from the group consisting of silicon and metal silicides.

8. A sintered and impregnated bearing composition consisting essentially of between about 60% and 65% by weight of nickel, about 33% silver and the balance material from the group consisting of silicon and metal silicides.

References Cited in the file of this patent

UNITED STATES PATENTS

| | | |
|---|---|---|
| 1,807,581 | Bates | June 2, 1931 |
| 2,159,763 | Hensel | May 23, 1939 |
| 2,180,826 | Hensel et al. | Nov. 21, 1939 |
| 2,195,307 | Hensel et al. | Mar. 26, 1940 |

FOREIGN PATENTS

| | | |
|---|---|---|
| 513,623 | Great Britain | Oct. 18, 1939 |